Feb. 22, 1927. D. E. VANDERVEER Re. 16,557
ADJUSTABLE WIND AND STORM SHIELD FOR VEHICLES
Original Filed April 14, 1919
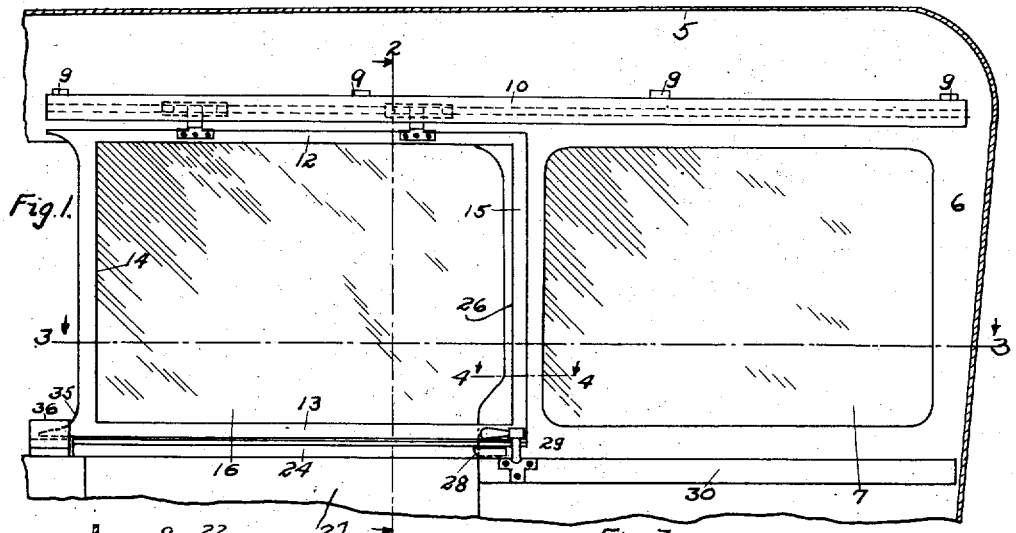
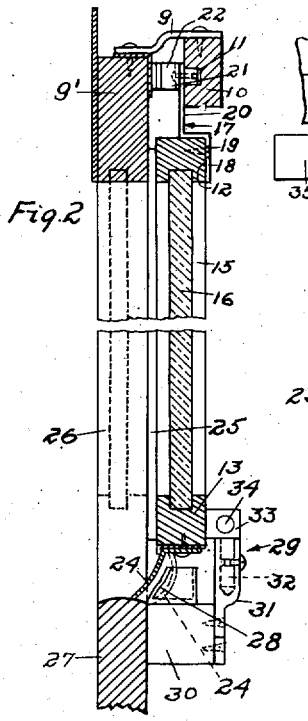
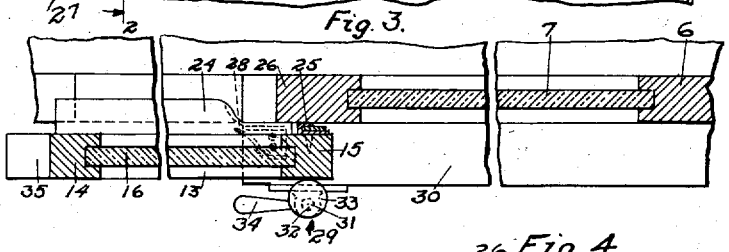
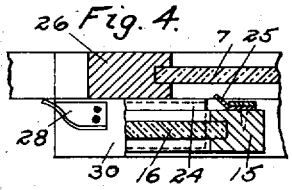
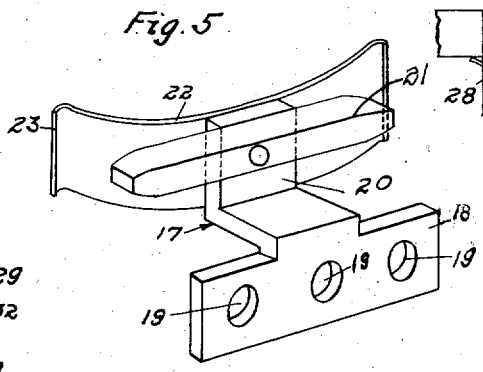
INVENTOR
DAVID E. VANDERVEER
BY B. J. Craig
ATTORNEY.

Reissued Feb. 22, 1927. Re. 16,557

UNITED STATES PATENT OFFICE.

DAVID E. VANDERVEER, OF LOS ANGELES, CALIFORNIA, ASSIGNOR OF ONE-HALF TO CHARLES W. LINK, OF LOS ANGELES, CALIFORNIA.

ADJUSTABLE WIND AND STORM SHIELD FOR VEHICLES.

Original No. 1,414,534, dated May 2, 1922, Serial No. 289,863, filed April 14, 1919. Application for reissue filed May 23, 1923. Serial No. 641,014.

My invention relates more particularly to a sliding window construction adapted to be detachably secured to the tops of motor vehicles.

A main object of my invention is to provide a glass frame construction which may be applied to vehicles known as touring cars having hinged front and rear doors and which includes a fixed window and a sliding window frame and wherein the sliding window frame in one position may be disposed adjacent the fixed window whence it may be drawn into operative position to effectively protect the occupant from the inclemency of the weather.

A further object of my invention is to provide a sliding window frame construction for motor vehicles that will not rattle, or vibrate during the operation of the vehicle.

A still further object of my invention is to provide a sliding glass frame construction for motor vehicles that will be substantially weather proof when drawn into operative position.

Other objects and advantages will be clearly apparent from the description appended hereto, reference being had to the accompanying drawings, in which:

Fig. 1 is a longitudinal section through the rear top portion of a motor vehicle, showing my improved glass frame in operative position.

Fig. 2 is an enlarged transverse sectional detail taken on line 2—2 of Fig. 1 and looking in the direction indicated by the arrows thereon.

Fig. 3 is an enlarged sectional detail taken on line 3—3 of Fig. 1 and looking in the direction indicated by the arrows thereon.

Fig. 4 is an enlarged detail cross section showing the weather strip guiding means taken on line 4—4, Fig. 1 the window frame being in an inoperative position.

Fig. 5 is a perspective view of one of the sliding frame suspension angles.

Referring more specifically to the drawings, 5 designates an automobile top of the permanent type, and 6 is one of the side walls of the body of the vehicle. The rear side walls 6 of the vehicle top are provided with permanent glass windows 7 of suitable configuration. Secured by brackets 9 or other suitable securing means to the longitudinally extending side rail 9′ of the vehicle top, is a suspension rail 10 provided with a longitudinally extending guide groove 11, for the reception of the window frame hangers. It will be understood from a reference to the drawings that although I have only illustrated one side of a motor vehicle, that the opposite side is identical in construction.

My improved sliding frame, preferably consists of a metallic frame composed of top and bottom rails 12 and 13, and vertical side rails 14 and 15, a plate glass 16 being mounted in the frame. Secured to the inner face of top rail 12 are a pair of suspension hangers 17, each preferably consisting of a plate 18 provided with a plurality of apertures 19 for the reception of attaching screws, and an upwardly extending tongue 20 formed integral therewith. Pivotally secured to the upper end of tongue 20, and on its inner face is an elongated suspension block 21 adapted to engage the guide groove 11 in the suspension rail 10, the pivoting of the block 21 permitting a free and unrestricted movement of the same when the window frame is moved from one position to another, also by pivotally attaching the block 21 to the tongue 20 any inequality or unevenness of the groove 11 will not affect its movement. Secured to the outer face of tongue 20 is a flat spring member 22, the ends 23 being bent into a curved form to permit of a free movement. Side suspension rail 10 is spaced apart from the vehicle side rail 9′ to provide space for the springs 22, the ends 23 of the springs bearing against the inner face of the side rail 9′, as clearly shown in Fig. 2 of the drawing. By providing spring members 22 all danger of the frame vibrating or rattling is obviated. Further, the said springs 22 maintain the sliding block 21 in spring pressed engagement wth the groove 11 formed in the suspension rail.

The lower rail 13 of the sliding window frame is disposed a short distance above the upper side edge of the vehicle body, and secured to its lower face by means of screws, or other suitable securing means, is a weather strip 24 preferably formed of a rubberized fabric, the weather strip 24 extending from one end of the frame to the other. The vertical side rail 15 of the frame is also provided on its contacting edge with a weather strip 25, formed of the same material as weather strip 24, said strip 25 contacting with one of the vertical rails 26 of the vehicle top as clearly shown in Figs. 3 and 4 of the drawing when the sliding frame is drawn into operative position. By providing the lower rail 13 and the side rail 15 of the frame with weather strips all danger of rain or of the elements entering the interior of the vehicle is obviated. Weather strips 24, when the sliding frame is drawn into position contacts with the upper edge of the rear vehicle door 27, the strip assuming the position as shown in Fig. 2 of the drawings when the hinged door 27 is closed. Strips 24 will assume the position shown in dotted lines in Fig. 2 when the window frame is in a retracted position, and in order that the strip may be guided outwardly so as to contact with the upper edge of the vehicle door 27, when drawn into operative position, I have provided a guiding finger or device 28, as clearly shown in Figs. 2 and 4 of the drawings. This guiding device 28 will guide the weather strip 24 outwardly on the upper edge of the vehicle door on a forward movement of the sliding frame and will guide the same inwardly when the frame is drawn rearwardly to an inoperative position. It will be noted that the sliding window 16 and the door 27 are substantially the same length.

In order to secure the lower portion of the metallic frame against movement, I have provided a locking device 29 which is secured to the inner side face of a longitudinally extending side bar 30 secured to the inner side of the vehicle body and lying directly below the fixed window 7. This locking device 29 preferably consists of a socketed member 31, the lower end of which is securely attached to the rail 30, the socketed portion extending above the rail. Mounted in the socketed member 31 is a cylindrical stem 32 held in engagement therewith in any suitable manner, and secured to the upper end of said stem is an eccentric disc 33 having an operating handle 34 projecting therefrom. When it is desired to move the frame forwardly, the disc 33 is rotated by means of the handle 34, so as to permit a sliding movement of the frame. The handle is then rotated into a locked position, the disc 33 contacting with the lower end of the vertical rail 15 and forcing it into engagement with the vertical rail 26 of the vehicle body as clearly shown in Fig. 3 of the drawing. When the sliding frame is in its rearmost position, the locking member contacts with the vertical rail 14 of the sliding frame, and securely holds it against movement.

The forward top and bottom end of the frame 14 is preferably curved as shown, and the lower curved end provides a projection 35 adapted to enter and engage a channel block 36 secured to the upper edge of the vehicle body as clearly shown in Fig. 1 of the drawing. When the frame is in a position as shown in Fig. 1 of the drawing, the locking device will securely hold the rear end of the frame in position while the block 36 will hold the front end of the frame against any undue movement.

From the above description it will be noted that I have produced a sliding frame construction for automobiles provided with permanent tops which will effectively protect the occupants in the rear seats when the weather is stormy or inclement.

It will be further noted that my frame construction can be mounted on vehicles without marring the same or detracting in any way from their original beauty of lines.

By providing spring suspension hangers all danger of rattling due to the vibration of the car when in motion is obviated.

What I claim is:

1. In combination with a vehicle provided with a permanent top, of a grooved suspension rail secured to said top, a sliding glass frame, suspension hangers secured to said frame, and a sliding block pivotally secured to each of said hangers, said blocks adapted to slidably engage the groove in said suspension rail, and means secured to said hangers and acting against said vehicle top to prevent vibration of said glass frame when the vehicle is in motion.

2. The combination with a vehicle provided with a permanent top, of a grooved suspension rail secured to said top, a sliding glass frame, suspension hangers secured to said frame, a sliding block secured to each of said hangers, said blocks adapted to slidingly engage the groove in said suspension rail, and a flat curved spring member attached to each of said hangers and bearing against the vehicle top; whereby to prevent vibration of the sliding glass frame when the vehicle is in operation.

3. In an automobile having a body provided with a door of a height equal to the height of the body and provided with a fixed top, the combination of a fixed window covering the side wall at the rear of said door, a movable window coextensive in height with the fixed window slidably mounted on said top and adapted when in its rear position to be positioned inside of the fixed window, said movable window having an engaging member at the lower front end thereof, a second engaging member on the automobile body adjacent the position occupied by the front of the movable window, said engaging members being adapted to coact to hold the window against rattling when in closed position, and a clamping member, operable from within the automobile for locking the movable window in desired adjusted position.

In testimony whereof, I hereunto affix my signature.

DAVID E. VANDERVEER.